G. WATT.
Corn Planter.
No. 23,206.
Patented Mar. 8, 1859.
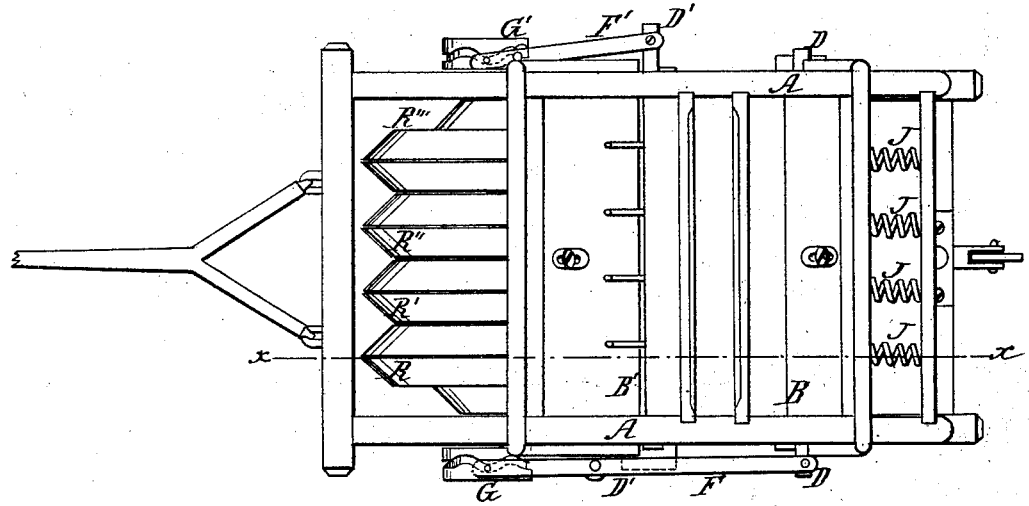
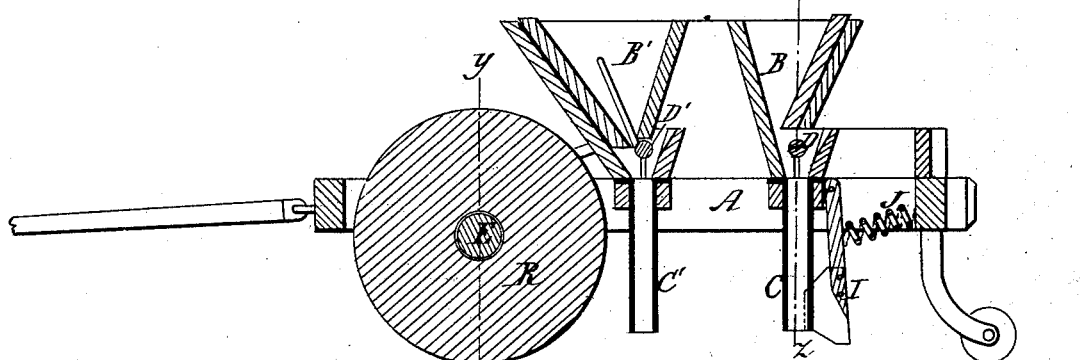
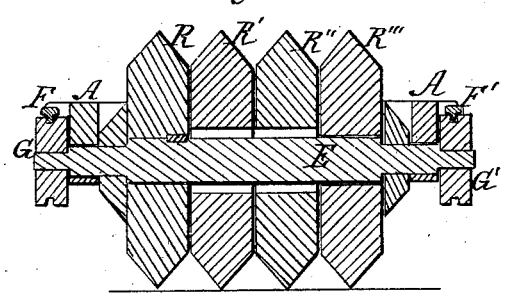
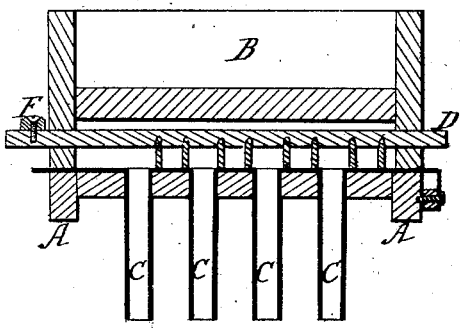

UNITED STATES PATENT OFFICE.

GEORGE WATT, OF RICHMOND, VIRGINIA.

IMPROVEMENT IN SEED-PLANTERS.

Specification forming part of Letters Patent No. 23,206, dated March 8, 1859.

*To all whom it may concern:*

Be it known that I, GEORGE WATT, of Richmond, in the county of Henrico and State of Virginia, have invented a new and useful Improvement in Seed-Planters; and I do hereby declare that the following is a full, clear, and exact description of the construction and operation of the same, reference being had to the annexed drawings, forming part of this specification, in which—

Figure 1 is a top view of the machine. Fig. 2 is a vertical longitudinal section on $x$ $x$. Fig. 3 is a transverse section taken on line $y$ $y$. Fig. 4 is a transverse section on line $z$ $z$.

Similar characters of reference in the several figures denote the same part.

The nature of my invention consists in furrowing the soil for the reception of the seed by means of a system of angular-faced rollers, arranged and operating as will be hereinafter set forth.

In the drawings, A is the frame of the machine, and B B' the hoppers—one for the grain and the other for the fertilizer.

C C' are the two systems of tubes, and D D' the agitating-shafts, reciprocated from the rotation of the roller-shaft E by means of the levers F F' and grooved wheels G G'.

The front of the frame rests on the system of rollers R R' R'' R''', the number of which is governed by the number of depositing-tubes. One of these rollers, R, is fastened to the shaft E, and gives the said shaft its rotation. The outer roller, R''', on the other extremity of the shaft, fits the shaft, but is free to turn upon it. The remainder of the rollers, R' R'', have openings through them larger than the shaft, so as to be able to conform to the surface passed over. The faces of these rollers are angular, and will, by their passage over the ground, depress the soil and form furrows therein.

In rear of the tubes C are the covers I, kept in position by the springs J. Rollers may be used instead of these scrapers, if it be deemed desirable.

The operation of the machine is as follows: The rollers form the furrows by pressing upon the soil, the fertilizer and grain are deposited, as in other seed planters, and the coverers, removing the earth from the sides of the angular furrows, complete the operation by covering the seed. The mode of forming the furrows above described is advantageous, inasmuch as the vegetation turned under in plowing remains under the soil receiving the seed, instead of being torn out by the opening-tooth used in other seed-planters. The operation of planting is thus facilitated and the vegetation turned under retained in a better position for enriching the soil.

I claim—

The series of angular-faced rollers arranged relative to their shaft, as described, for opening the furrows, in combination with the seed tubes and coverers, substantially as specified.

In testimony whereof I have hereunto signed my name before two subscribing witnesses.

GEO. WATT.

Witnesses:
GEO. PATTEN,
JOHN S. HOLLINGSHEAD.